Patented Mar. 29, 1938

2,112,412

UNITED STATES PATENT OFFICE 2,112,412

COATING COMPOSITION AND METHOD OF PREPARING THE SAME

Isidor Wetchler, Woodhaven, N. Y.

No Drawing. Application April 23, 1935,
Serial No. 17,791

5 Claims. (Cl. 134—26)

This invention relates to surface coating preparations and more particularly to a varnish, paint and similar liquid coating composition.

Still more particularly, my invention relates to a coating preparation which may be painted, brushed, sprayed or trowelled for surfacing purposes, to maintain hygienic and sanitary conditions by reason of its fungicidal, bactericidal and germicidal properties and generation of materials toxic to pathogenic bacteria, fungi.

More particularly, it is contemplated as an object of my invention to provide a surfacing preparation which may be applied by known means, such as brushing, spraying, trowelling, to provide an endurable surfacing film in the nature of a paint or varnish, characterized by the additional properties of inhibiting the growth and development of bacteria and fungi and other bodies detrimental to hygienic conditions and sanitation, as well as avoiding any alteration in appearance of the desirable surfacing film.

It is still further contemplated as an object of my invention to provide a surfacing preparation of durable and lasting quality having the protective properties of varnishes and paint materials combined with such toxicity as to inhibit the growth or development of bacteria and fungi throughout the normal period of life of the protective coating, utilizing the alterations incident to film exposure of paint and varnish materials to progressively and continually generate bactericidal and fungicidal media.

Still further objects of my invention reside in the provision of an interior surfacing material in the nature of a paint or varnish of durable character, innocuous for application by laborers applying the same or for use by inhabitants, characterized by germicidal and fungicidal properties, and the further property of inhibiting the development or growth of bacteria or fungi during the normal life of coating preparations, and by the further property of including materials which are compatible for combination with varnish and paint materials.

Still further objects of my invention reside in the method of preparing and applying surface finishing materials in the nature of varnishes and paints which are particularly characterized by germicidal and fungicidal properties and for the inhibiting of the growth and development of bacteria and fungi.

Where I have attempted to provide surface finishing materials in the nature of paints and varnishes of germicidal property, including materials having known properties of this character in the active condition, the addition of such germicides, due to surface exposure, is obnoxious to the laborers applying the material, the occupants of the rooms so treated, and is otherwise deleterious to surfacing materials in the nature of paints and varnishes.

The utilization of directly active germicides or fungicides, in addition to the objectionable properties above noted, become dissipated in a short time and are not comparable to the normal life of the surfacing material in which, or to which the germicidal materials have been added. Incompatibility between germicides and surfacing materials serves to add the germicidal material at the sacrifice of the protection to be afforded by the surfacing material in the nature of paints and varnishes.

My invention in one phase thereof, is predicated upon the discovery that film forming materials used for surfacing, such as the vehicles of paints and varnishes, undergo continued alteration among which changes there is an accompanying oxidation. Such alteration in the presence of atmospheric moisture which I believe is accompanied by hydrolysis, may be effectively utilized to alter stable inactive materials to impart to the surfacing film germicidal and fungicidal properties throughout the normal life of liquid coating or surfacing materials, such as paints and varnishes.

More specifically, one phase of my invention is predicated upon the discovery that known germicidal materials, such as active chlorine, sulphur, the phenols, the aldehydes, such as formaldehyde, though obnoxious and undesirable in isolated form in liquid coating preparations and deleterious to the surfacing material, may be so stabilized by interaction and when embodied in film-forming materials may thereafter be made available for their germicidal and fungicidal properties, by reason of the alteration which I believe occurs in the film forming material in which these constituents are present, so that during the normal life of the surfacing material, contact with pathogenic bodies generate known germicides or fungicides to their active condition.

Still more specifically, another embodiment of my invention is predicated upon the method of preparing film forming surface coating materials in the nature of varnishes or paints of stable and durable character which will make such materials as the halogens, for example, chlorine, sulphur, the phenols, such as phenol, cresol, resorcinols, formaldehyde and similar aldehydic compounds, its polymers or isomers contribute to the production of durable and lasting film-forming materials, particularly for interior decoration, yet available for providing these materials in status nascendi substantially throughout the life of a durable and lasting film-forming composition, such as paints and varnishes, which, by reason of what I believe to be a continually altering action in the film forming materials, renders the surface coating effective as a germicide and fungicide and without providing an obnoxious coating preparation during the time that the coating is applied in position or during its normal life on walls or surfaces treated with my preparation.

Still more specifically, in the preferred embodiment of my invention, I have provided a durable and lasting surfacing material in the nature of a paint or varnish, in which formaldehyde is made available for its germicidal or fungicidal and other toxic properties in respect to pathogenic bodies, by providing in a liquid coating composition, a material compatible to the vehicles thereof, but which slowly generates formaldehyde in status nascendi during the normal life of a durable and effective liquid coating composition, such as paints or varnishes. This preferred feature of my invention is predicated upon the discovery that the oxidizing type of paints and varnishes are compatible with the general class of acetals, more specifically, ethylal, and that such alterations which I believe occur in film forming materials of this character serve to slowly and continuously generate formaldehyde in status nascendi in the case of ethylal; and an aldehyde, namely, an alkyl-aldehyde in the case of other acetals contemplated by me during the time that the alterations in the film forming materials occur or upon contact with hydrolyzing bodies which may contain pathogenic bodies, such as bacteria or fungi, thereby to provide a film forming surface coating material effective throughout its life as a bactericidal or fungicidal material.

In the attainment of the foregoing objectives, from a more specific description of the invention, such objectives will more clearly appear herein or be hereinafter pointed out. Specifically, I utilize the germicidal, bactericidal, fungicidal or other toxic properties of such materials, as chlorine, sulphur, phenol and formaldehyde as the active components in a vehicle forming a varnish or compound or other surfacing preparation. These constituents, in reacted condition, are initially included in the form contributing to the preparation of a workable and durable surfacing material. They are embodied under conditions which will provide a workable, durable yet innocuous surfacing preparation which will undergo alteration in its position on the walls, ceiling, woodwork, floors, furniture, wherever interior decoration is effected, so that during the normal life of this durable and effective finish, generation of the toxic component will occur to effect an efficient bactericidal, germicidal and fungicidal condition, conducive to hygienic and sanitary conditions.

In general, my preparation comprises an oily paint or varnish vehicle modified by a metastable phenolic aldehyde resinous condensation product, preferably augmented by thinners which include a stable innocuous compound capable of generating formaldehyde during the normal life and progressive alteration occuring in oxidizable types of liquid coating preparations, such as paints and varnishes.

In the preferred form of my invention I provide (A) a vehicle; (B) a phenol formaldehyde resinous condensation product; (C) a thinner, one or more or all of which may contain components which, during the normal life of the surfacing film, continuously and progressively are latent with the property of generating toxic components to bacteria, germs, fungus and other pathogenic bodies.

Batch A

I initially prepare the vehicle by polymerizing perilla oil with about 5% of sulphur monochloride. These materials are interacted and polymerization ensues in about ten minutes. The temperature is allowed to rise to about 160° F.

While I have described and prefer perilla oil, other oily bodies, such as Menhaden oil, fish oils, wood oil, linseed oil, soya bean oil, cotton seed oil, poppy seed oil, or any of the numerous drying or non-drying vegetable or animal oils, or mixtures thereof, may be used, depending upon the qualities desired in the final product.

While I have specified and prefer sulphur monochloride as the polymerizing agent, other polymerizing agents may be employed, such as sulphur bichloride, sulphur tetrachloride, or any of the group of elements comprising sulphur or oxygen or combinations of both in union with one or more of the halogens.

While I have specified and prefer the addition of about 5% of the polymerizing agent, the percentage may be materially diminished, with a diminishing of the viscosity of the oil treated and with some diminution of the germicidal property. An increased percentage of the polymerizing agent may be used, with an increase in the thickening or viscosity of the oil. This may be increased to a degree of viscosity depending upon the method of applying the final product, and good brushing qualities may be retained by adding the polymerizing agent in percentages as high as 10%. Where the final composition is otherwise applied than by brushing, still higher percentages of the polymerizing agent may be employed.

Batch B

This batch is prepared from materials as follows:

| | Per cent |
|---|---|
| Wood oil | about 47.5 |
| Rosin (water white) | do 1 |
| Phenol | do 21.5 |
| Formaldehyde (40% by volume) | do 22 |
| Sulphur monochloride | do 8 |

The combination of the ingredients above mentioned exothermically reacts to induce a condensation reaction, with a consequent formation of a layer providing a metastable phenol formaldehyde resin varnish and the separation of the layer of water.

The water so formed is separated and the resinous mass is utilized, as will appear more clearly as this description proceeds.

While I have specified China-wood oil as the preferred ingredient, perilla oil may be used, and to a certain extent, any of the oils specified under Batch A.

While I have specified rosin as the preferred resinous component in that this material induces a blending between the oil and the phenol aldehyde resin that is formed, other resins, such as Manilla, Congo, dammar, ester gums, and other neutral or acidic gums, as well as cumaron resin, may be used.

While I have specified phenol specifically as the phenolic component, I may use other phenolic bodies, such as cresol, resorcinol.

Also, while I have specified formaldehyde as my preferred ingredient, other aldehydic bodies, and the polymers and isomers of formaldehyde may be utilized.

The quantity of the phenolic component or aldehydic component may be varied within a wide range, preferably 15 to 20% below or above the quantity prescribed in the preferred embodiment.

While I have specified the rosin component as preferably about 1%, this ingredient may, to a certain extent, be omitted, or increased to more than double or triple the quantity, depending upon the blending or dispersing action desired and the particular resinous component that is utilized.

While I have specified sulphur monochloride as the preferred ingredient, this material is added not only for its latent germicidal properties retained in the resinous residuum, but also as a catalyst, and it is preferred by me to use an acid catalyst, though preferably an acid catalyst decomposing into ingredients having germicidal qualities, by using catalysts made of sulphur derivatives, though derivatives of the group of materials including tellurium, selenium, oxygen in combination with any of the halogens may be used.

Batch C

Batch C is preferably a mixture of solvents comprising spirits of turpentine, petroleum spirits, pine oil and ethylal. These materials preferably are added in the following proportions—

|  | Gallons |
|---|---|
| Spirits of turpentine | 15 |
| Petroleum spirits | 15 |
| Ethylal | 3 |
| Pine oil | 2 |

While I have specified spirits of turpentine and petroleum spirits as the primary volatile constituents, wood turpentine, dipentine, high flash naphthas, various types of petroleum distillates, such as varnish makers' and painters' naphtha (V. M. & P. naphtha), varnolene and kerosene may be utilized.

In the Batch C as above described I have included ethylal. This ingredient may be generally designated as an acetal, and forms an essential component of my composition. The ethylal has a boiling point of from 85 to 89.5° C., and is preferred by me in that it blends with the other constituents and is compatible with the ingredients of the other batches.

Though I have specified and prefer ethylal H·CH (OC$_2$H$_5$)$_2$, other acetals, such as diethyl acetal may be used. In general, any of the acetals of the general formula characteristic of the acetals, such as dipropyl acetal, dibutyl acetal, ethyl-propyl acetal, ethyl-butyl acetal may be used. The acetals are specified by me whether added in the volatile Batch C or in ordinary paints and varnishes, in that they are normally non-objectionable or innocuous in odor, compatible with paints and varnishes, substantially stable and which in the claims I have designated as "normally stable" but under conditions involving the alteration occuring in oxidizable paint and varnish vehicles or vehicles of an acidic character induced by oxidation and hydrolysis, the acetals serve to generate minute quantities of an aldehyde, namely formaldehyde in the case of ethylal, and an alkyl-aldehyde, in the other enumerated examples. The compound ethylal breaks up into formaldehyde and the corresponding alcohol. This action occurs continuously during the maturing of the paint or varnish film, especially in the presence of atmospheric moisture.

While the acetals may be embodied in ordinary paints and varnishes to be effective for my purpose, it is preferred to add the material in association with the materials of Batches A, and B, as above described. I have found this association of ingredients to result in exceedingly desirable properties.

The acetal component may be added within a wide range, and though it is preferred that it constitute about 10% of Batch C, it may be reduced to about 2%, with consequent reduction in the germicidal qualities, or increased as high as 50%. Because of the comparatively high boiling character of the acetals, modification of the finishing film may result if the acetals are added in too high a quantity, and therefore should be maintained in proportions which will not detract from the film forming character of the paint or varnish.

Having described the various batches made for my preferred materials, Batches A, B, and C may be intermixed to form what may be designated as a "varnish vehicle". The batches may be added as follows, to obtain a desirable product—

|  | Parts |
|---|---|
| Batch A | 1 |
| Batch B | 1 |
| Batch C | 2 |

The quantity of these batches may be varied within a wide range, dependent upon the method used for applying the final varnish. The relationship of the batches as prescribed provides a varnish of excellent brushing characteristics. For applying by a spraying operation, Batch C may be materially increased in quantity. For trowelling or more or less plastic application, Batch C may be materially reduced.

The relationship of Batch B to Batch A may be varied to determine the hardness and gloss, and film forming characteristics of the final film, in a manner well-recognized in blending resins with oils to provide varnishes.

Upon combining the Batches A, B, and C to provide the varnish vehicle in accordance with my preferred form of the invention, paint addition products may be embodied by grinding the same into the vehicle, and such mixed paint addition materials as zinc oxide, titanium oxide, lithopone, white lead, whiting, clay, lead and manganese and cobalt dryers, in appropriate mixtures, may form the pigmenting material and addition products, and these may be added in about equal parts of the pigmenting material and dryers to the vehicle.

Where the pigmenting material is of a basic character, while not objectionably altering in any substantial manner the desirable qualities of my vehicle, herein specified, I find it desirable to embody into the final paint mixture about 1 to 3% of powdered sulphur, in that I have found that under conditions in which a paint product is made with my vehicle, the germicidal, bactericidal or fungicidal properties are accentuated by the presence of this added component.

In general, it will be observed that I have provided a coating material specifically for interior decorating, such as for coating walls, ceilings, woodwork, furniture, floors, forming a durable finishing material of innocuous character during application, but which, during the alteration occurring in the maturing of the film, or the decomposition by reason of oxidizing processes, in the presence of atmospheric moisture or contact with pathogenic bodies, slowly renders available germicidal, bactericidal and fungicidal components conducive to hygienic and sanitary conditions.

Having thus described my invention and illustrated its use, what I claim as new and desire to secure by Letters Patent, is—

1. A preparation of the character described forming a normally stable and durable film comprising an odoriferously innocuous and inoffensive latent germicidal aldehyde generating compound taken from the group consisting of ethylal, diethyl acetal, dipropyl acetal, dibutyl acetal, ethyl-propyl acetal, ethyl-butyl acetal in a drying oil paint vehicle, the resulting film whereof altering during its normal life to slowly generate an aldehyde as a germicidal component from one of the members of the group of materials aforesaid.

2. A preparation of the character described forming a normally stable and durable film comprising a paint vehicle including a drying oil and ethylal, the resultant film altering during its normal life to generate an aldehyde as a germicidal component from the ethylal.

3. A preparation of the character described forming a normally stable and durable protective paint coating film comprising an odoriferously innocuous latent germicidal aldehyde generating compound taken from the group consisting of ethylal, diethyl acetal, dipropyl acetal, dibutyl acetal, ethyl-propyl acetal, ethyl-butyl acetal in a drying oil paint vehicle containing a sulphur halide polymerized fatty oil.

4. A preparation of the character described forming a normally stable and durable protective paint coating film comprising an odoriferously innocuous latent germicidal aldehyde generating compound taken from the group consisting of ethylal, diethyl acetal, diphopyl acetal, dibutyl acetal, ethyl-propyl acetal, ethyl butyl acetal in a drying oil point vehicle containing a sulphur halide polymerized fatty oil together with a phenol aldehyde condensation product produced by reacting a fatty oil with a phenol and an aldehyde in the presence of a sulphur halide.

5. A preparation of the character described forming a normally stable and durable protective paint coating film comprising an odoriferously innocuous latent germicidal aldehyde generating compound taken from the group consisting of ethylal, diethyl acetal, dipropyl acetal, dibutyl acetal, ethyl-propyl acetal, ethyl butyl acetal in a drying oil paint vehicle containing a sulphur halide polymerized fatty oil together with a phenol aldehyde condensation product produced by reacting a fatty oil with a phenol and an aldehyde in the presence of a sulphur halide and including a natural resin.

ISIDOR WETCHLER.